US012692021B2

(12) United States Patent
Abrami et al.

(10) Patent No.: US 12,692,021 B2
(45) Date of Patent: Jul. 28, 2026

(54) AEROSPACE-GRADE INK SYSTEM

(71) Applicant: PRC-DESOTO INTERNATIONAL, INC., Sylmar, CA (US)

(72) Inventors: Siamanto Abrami, Glendale, CA (US); Matthew Robert Davis, Burbank, CA (US)

(73) Assignee: PRC-DESOTO INTERNATIONAL, INC., Sylmar, CA (US)

( * ) Notice: Subject to any disclaimer, the term of this patent is extended or adjusted under 35 U.S.C. 154(b) by 0 days.

(21) Appl. No.: 18/851,130

(22) PCT Filed: Mar. 22, 2023

(86) PCT No.: PCT/US2023/064801
§ 371 (c)(1),
(2) Date: Sep. 26, 2024

(87) PCT Pub. No.: WO2023/192792
PCT Pub. Date: Oct. 5, 2023

(65) Prior Publication Data
US 2025/0206465 A1      Jun. 26, 2025

Related U.S. Application Data

(60) Provisional application No. 63/362,060, filed on Mar. 29, 2022.

(51) Int. Cl.
| | |
|---|---|
| *C09D 11/102* | (2014.01) |
| *B64C 1/00* | (2006.01) |
| *B64F 5/10* | (2017.01) |
| *C09D 11/30* | (2014.01) |
| *C09D 11/54* | (2014.01) |

(52) U.S. Cl.
CPC .................. *B64F 5/10* (2017.01); *B64C 1/00* (2013.01); *C09D 11/102* (2013.01); *C09D 11/30* (2013.01); *C09D 11/54* (2013.01); *B64C 2001/0072* (2013.01)

(58) Field of Classification Search
CPC ..... B64F 5/10; B64C 1/00; B64C 2001/0072; C09D 11/102; C09D 11/30; C09D 11/54; B05D 2401/10; B05D 2420/01; B05D 2420/03; B05D 2425/01; B05D 2503/00; B05D 7/572; B05D 7/5783; B05D 1/36;
(Continued)

(56) References Cited

U.S. PATENT DOCUMENTS 8,481,884 B2 * 7/2013 Bausen ..................... B64F 5/10
219/121.85
8,557,388 B2 10/2013 Hong
(Continued)

OTHER PUBLICATIONS

International Search Report and Written Opinion mailed in International Application No. PCT/US2023/064801 on Jul. 6, 2023, 13 pages.

*Primary Examiner* — William P Fletcher, III

(57) ABSTRACT

A method for applying a coating to a surface of an aircraft including applying a basecoat layer, applying an ink layer onto a top surface of the basecoat layer, and applying a topcoat layer onto a top surface of the ink layer where each of the basecoat layer, the ink layer, and the topcoat layer interact to form a single homogenous layer with respect to a film forming component on the surface of the aircraft.

13 Claims, 1 Drawing Sheet

(58) Field of Classification Search
　　CPC .............. B05D 1/0226; B05D 2425/03; B05D
　　　　　　　　　　　　　　　　　　　　　　　　　2508/00
　　USPC ................................................. 427/333, 337
　　See application file for complete search history.

(56)　　　　　　　　　　References Cited

U.S. PATENT DOCUMENTS

|  |  |  |  |
|---|---|---|---|
| 9,527,275 B1 | 12/2016 | Flannigan et al. | |
| 2006/0044376 A1 | 3/2006 | Baird et al. | |
| 2013/0344253 A1 | 12/2013 | Abrami et al. | |
| 2014/0099481 A1* | 4/2014 | Gaffie ...................... | B05D 7/57 |
| | | | 427/265 |
| 2014/0212584 A1 | 7/2014 | Tang et al. | |
| 2016/0032149 A1* | 2/2016 | Tighe ...................... | B32B 27/10 |
| | | | 428/41.8 |

* cited by examiner

101

Topcoat Layer
106

- - - - - - - - - - - - - - - - - - - - - -

Paint Layer
104

- - - - - - - - - - - - - - - - - - - - - -

Basecoat Layer
102

AEROSPACE-GRADE INK SYSTEM

CROSS REFERENCE TO RELATED APPLICATION

This application claims the benefit under 35 U.S.C. § 119(e) of U.S. Provisional Application No. 63/362,060, filed on Mar. 29, 2022, which is incorporated by reference in its entirety.

FIELD

The present disclosure relates to a three-layer coating system of chemically compatible basecoat, ink, and topcoat that can be used in aerospace applications.

BACKGROUND

Traditionally, applying decorative finishes to an aircraft has involved one of two methods: vinyl decals or stenciled painting. Stencil painting techniques involve applying a stencil to the aircraft to ensure a specific design is followed and that paint is not applied to rivets, bolts, or openings where paint could cause issues with functionality. This painting method is time consuming, expensive, and often leads to inaccurate and/or poor visual performance of the paint. Alternatively, vinyl decals, often printed using wide-format inkjet printing methods, are printed onto a separate substrate and then applied to the aircraft. However, these decals are difficult to apply, and the resulting coating performance of systems including vinyl decals is poor. More recently, aerospace companies have taken interest in direct inkjet or paint-jet printing on to the surface of the aircraft, which allows users to digitally print complex and unique graphics onto the aircraft without the use of a decal. However, inkjet or paint-jet printing leads to detrimental effects on the performance of the resulting coating due to the incompatibility of the ink with the rest of the aerospace coating system. As such, what is needed is an inkjet system that can be used in aerospace applications which preserves the overall performance of the resulting coating.

SUMMARY

In a first example of the present disclosure, a method for applying a coating to an exterior surface of an aircraft is disclosed. The method can include applying a basecoat layer, applying an ink layer onto a top surface of the basecoat layer, and applying a topcoat layer onto a top surface of the ink layer. In some cases, each of the basecoat layer, the ink layer, and the topcoat layer interact to form a single homogenous layer with respect to a film forming component on the exterior surface of the aircraft.

In a second example of the present disclosure, a coating applied to an exterior surface of an aircraft is disclosed. In some cases, the coating can include a basecoat component, an ink component, and a topcoat component, where each of the basecoat component, the ink component, and the topcoat component are chemically compatible with one another. When the coating is applied to the exterior surface of the aircraft, all three components can form a single homogenous layer with respect to a film forming component.

In a third example of the present disclosure, an aircraft coating system is disclosed. The aircraft coating system can include a basecoat, an ink, and a topcoat. Each of the basecoat, ink, and topcoat can share a first reactant, the basecoat and topcoat can share a second reactant, and when each of the basecoat, the ink, and the topcoat are applied in separate applications steps, the first reactant interacts with the second reactant to form a homogenous film forming component. In this case, the aircraft coating system substantially maintains the chemical and physical properties of each of the basecoat and the topcoat.

BRIEF DESCRIPTION OF THE DRAWINGS

FIG. 1 illustrates a cross sectional view of an example of a coating stackup as described in the present disclosure.

DETAILED DESCRIPTION

The disclosure described herein includes a coating system for painting an aircraft comprising a three-layer coating stackup that is compatible with inkjet printing technologies.

Treating and coating structural surfaces of an aircraft is a time consuming and extensive process. Surface preparation entails many technicians to perform a series of manual operations to clean, mask, sand, and otherwise prepare the surface before coating can begin. Currently, coating the structural surfaces of an aircraft include applying an underlying primer layer followed by either a protective topcoat layer including the livery, or a colored clearcoat followed by a protective clearcoat. These decorative liveries are typically applied using a complex process which involves a series of masking steps followed by coating and clear coats as needed. Although the primary function of the paint coatings is corrosion control, these distinguishing liveries may be applied for branding, marketing, or aesthetic purposes. There is considerable difficulty in accurately laying down the masking material on large complex surfaces making process prone to error. Performing these processes on large surface areas requires a significant amount of labor, time, and resources.

Ink or paint-jet technologies have the potential to eliminate masking requirements by directly printing graphics on surfaces. This capability is analogous to inkjet printing on paper and uses many of the same technologies. Although inkjet technologies may allow for the reduction in labor and time in the painting process, a system designed around aerospace quality coatings is needed to meet stringent performance needs.

In particular, there is a need to develop an ink system that is chemically compatible with aerospace paint formulations. The lack of tailored aerospace-grade ink products creates delays in inkjet implementation due to the high precision application demands of the aerospace industry. The system disclosed herein addresses this and other needs.

Specifically, the present disclosure provides a coating system that includes the following layers in a stack-up: a basecoat, an ink, and a topcoat, where the ink is applied by an inkjet-printing process. The composition of each layer includes at least one shared film forming component, and when the components of each of the layers interact (e.g., as based upon the chemical compatibility between each layer), results in a homogenous coating including the ink-jet printed ink. The homogeneous coating may exhibit advantageous performance characteristics such as high chemical resistance, high resistance to erosion, high durability, high smoothness (e.g., low orange peeling and minimization of surface defects), high surface adhesion, high inter/intra-coat adhesion, high buffability, and high stain resistance, all while preserving the visual appeal of the ink-jet printed layer.

I. Definitions

For purposes of the following detailed description, it is to be understood that the disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

It should be understood that the term "homogenous" when used in relation to the coating system refers to the homogeneity of the film former. In other words, the cured coating will have a homogenous distribution of the film former but other components such as pigments, fillers, and additives may be striated in layers.

The phrase "chemical compatibility" relates to the ability of multiple initial layers to form into a homogenous layer during the curing or gelation process of the film.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" pigment, "a" topcoat, and the like refer to one or more of any of these items.

II. Stackup Formulations

FIG. 1 illustrates an example of a stackup 101 of a coating system of the present disclosure. Stackup 101 may be a three-layer coating system including basecoat layer 102, ink layer 104, and topcoat layer 106. Although illustrated as including three layers, additional layers may be present (e.g., additional layers above, and or below each of basecoat layer 102 and/or topcoat layer 106). For example, a primer layer below basecoat layer 102 and/or a clearcoat layer above topcoat layer 106 may be present in some cases.

Each of the layers of stackup 101 may be chemically compatible with the layer above and below, and upon curing, the individual layers form a homogenous and uniform coating. For example, each of layers 102, 104, and 106 may cure to form a homogeneous stackup 101. The homogeneity may be based upon the reactants of each layer 102, 104, and 106 of the stack-up 101 interacting (e.g., being chemically compatible with one another) to form a homogenous coating. It is to be understood, however, that although a homogenous distribution of the film former may be achieved after curing, basecoat layer 102, ink layer 104, and topcoat layer 106 may contain other components that remain striated. For example, the pigments contained in the ink layer 104 may remain in place once printed, preserving the visual effect of the livery printed on the aircraft within the resulting coating.

Stackup 101 may be a polyurethane-based coating system including one or more polyurethane films. Examples of the polyurethane films of the present disclosure are reaction products of isocyanates, and polyols. Examples of isocyanates include aromatic, (cyclo)aliphatic and ar(aliphatic) diisocyanates. Specific examples can include diisocyanate, toluene diisocyanate, xylylene diisocyanate, 1,6-hexamethylene diisocyanate and isophorone diisocyanate. Higher functionality polyisocyanates such as triisocyanates can be used. Examples are isocyanurates of diisocyanates such as the isocyanurates of isophorone diisocyanate and 1,6-hexamethylene diisocyanate. Examples of polyols can include high-molecular weight polyols, such as polymeric polyol formulations including a polymer backbone. The polymer backbones can be of any applicable length, which results in the high molecular weight polyol compound. Examples of high molecular weight polyol-containing compounds include polyesters, polyethers, polyacrylates, and polycarbonates.

Basecoat layer 102 can be selected from a suitable basecoat formulation for painting applications. The basecoat formulation may be any color, for example: white, grey, tan, beige, or brown. The basecoat layer 102 may be applied to a pre-applied primer layer (unillustrated) and/or applied in conjunction with a primer. Examples of suitable primers include Desoprime™ and/or Chromate™ primers such as Desoprime™ CA7502, CA7502E, CA7502EW and/or Chromate Primers CA7700, and CA7755. Any of these primers are compatible with the basecoat/clearcoat (BCCC) systems as described herein.

The basecoat formulation of basecoat layer 102 may be specifically selected for aerospace applications. For example, the basecoat formulation may be selected based upon compatibility with a BCCC (basecoat/clearcoat) system, such as Desothane® HD basecoat/clearcoat systems produced by PPG Aerospace. Suitable basecoat formulations include, but are not limited to, Desothane® HD CA9007 and Desothane® HD 9008 basecoats, both polyurethane-based basecoat systems supplied by PPG Aerospace.

The basecoat layer 102 includes a film forming component. The film forming component may serve as a cross-linking agent and can be selected from any number of compounds which contain a suitable cross-linking functional group. For example, as relating to polyol-functional groups, the film forming component may be a polyester-based compound, an acrylic-based compound, a polycarbonate-based compound, a polyether-based compound, or any other compound that includes a polyol suitable for aerospace applications. In some cases, the film forming component may be part of a resin and/or epoxy. The film forming component may interact with one or more other components of the basecoat layer 102, such as with the isocyanate component when forming basecoat layer 102. The interaction of the film forming component and the one or more components of the basecoat layer 102 may convert the components of the basecoat layer 102 into a polyurethane film. Upon curing, the polyurethane film may contain one or more free functional groups, such as free alcohol and/or free isocyanate group(s), which may interact with other components of either ink layer 104 and/or topcoat layer 106. In these cases, the resulting polyurethane film maybe homogeneous throughout each of the basecoat layer 102, ink layer 104, and topcoat layer 106, as will be described further herein.

The basecoat formulation of basecoat layer 102 may also include any number of various additives, including solvents, light stabilizers/screeners, and/or any other suitable components that result in advantageous rheology profiles for painting applications. The basecoat formulation may also be dissolvable in (e.g., removeable by) one or more additional solvents.

Ink layer 104 includes an ink formulation that can be selected based upon chemical compatibility with either, or both of, the formulations of basecoat layer 102 and topcoat layer 106. For example, ink layer 104 may be compatible with a BCCC system, such as Desothane® HD basecoat/clearcoat system CA 9007 and/or 9008. In this case, the ink formulation of ink layer 104 contains a film forming component that may be chemically compatible with the components of either, or both of, basecoat layer 102 and topcoat layer 106. For example, the ink formulation may contain a polyol component, which can be substantially similar to, or in some cases, identical to, the polyol component of the basecoat layer 102 and/or topcoat layer 106. Therefore, in some examples, each of the basecoat layer 102, ink layer 104, and topcoat layer 106 may share the same film forming component (e.g., polyol component). For example, ink layer 104 may include any one of a polyester-based compound, an acrylic-based compound, a polycarbonate-based compound, a polyether-based compound, and either, or both of, basecoat layer 102 and topcoat layer 106 may also include the same polyester-based compound, acrylic-based compound, polycarbonate-based compound, or polyether-based compound of ink layer 104. In any of these cases, the film-forming compound may act as a polyol in the polyol-isocyanate reaction to form the polyurethane coating, and the film forming component of the ink layer 104 serves as an additional polyol in the reaction.

The film forming component of the ink layer 104 may interact with one or more components of the basecoat layer 102 and/or topcoat layer 106. As described previously, the basecoat layer 102 may include an isocyanate component which chemically reacts with the polyol component when forming stackup 101. In this case, the ink formulation includes a film forming component including a polyol compound, that further reacts with the isocyanate component of the basecoat layer 102 to produce the polyurethane coating. Due to the chemical compatibility of the ink layer 104 and the basecoat layer 102, the polyurethane coating is homogeneous throughout both the basecoat layer 102 and ink layer 104. As will be described in further detail herein, topcoat layer 106 may also include an isocyanate component and the polyol component, and ink layer 104 may further react with the isocyanate component of topcoat layer 106 to form a single homogeneous stackup 101 with respect to the resulting polyurethane film.

The ink formulation of ink layer 104 also includes substances that impart color, opacity and/or other visual effects to the composition. In this case, ink layer 104 may contain colorants that are added to the coating in any suitable form such as dispersions, solutions, flakes, and/or discrete particles. Example colorants include pigments, dyes, and tints, such as those used in the paint industry and/or listed in the Dry Color Manufacturers Association (DCMA), as well as special effect compositions. The colorants may impart any color to the ink layer 104 such as black, blue, magenta, yellow, red, green, or violet.

As will be described in further detail herein, the ink formulation of ink layer 104 can be applied by an ink-jet printing process. In this case, the ink formulation of ink layer 104 may include any number of various additives, including solvents, light stabilizers/screeners, and/or any other suitable components that result in advantageous rheology profiles for inkjet printing applications. The ink formulation may also be dissolvable in (e.g., removeable by) one or more additional solvents.

Topcoat layer 106 includes a topcoat formulation that can be selected based upon chemical compatibility with either, or both of, basecoat layer 102 and ink layer 104. Similar to basecoat layer 102, topcoat layer 106 can include a film forming component. The film forming component may serve as a crosslinking agent and can be selected from any number of compounds which contain a suitable cross-linking functional group. For example, as relating to polyol-functional groups, the film forming component of topcoat layer 106 can be any one of a polyester-based compound, an acrylic-based compound, a polycarbonate-based compound, a polyether-based compound, or any other compound that includes a polyol suitable for aerospace applications. In some cases, this film forming component may be part of a resin and/or epoxy. The film forming component may interact with one or more other components of the topcoat layer 106, such as with the isocyanate as discussed in relation to polyurethane-based films, when forming topcoat layer 106. The interaction of the film forming component and the one or more components of the topcoat layer 106 may convert the components of the topcoat layer 106 into a polyurethane film. The polyurethane film may contain one or more free functional groups, such as free alcohol and/or free isocyanate group(s), which may interact with other components of either ink layer 104 and/or topcoat layer 106 when forming stackup 101.

The topcoat formulation of topcoat layer 106 may be selected specifically for aerospace applications. For example, the topcoat formulation may be selected based upon compatibility with a BCCC (basecoat/clearcoat) system, such as Desothane® HD basecoat/clearcoat system (BCCC) produced by PPG Aerospace. Suitable topcoat formulations include, but are not limited to Desothane® HD CA9007/B900, Desothane® HD CA9005, and Desothane®-HD-9008B0900D as well as other polyurethane-based topcoat formulations. These topcoat formulations may be substantially transparent and function as the clearcoat of the BCCC system.

The topcoat formulation of topcoat layer 106 may also include any number of various additives, including solvents, light stabilizers/screeners, and/or or any other suitable components that result in advantageous rheology profiles for painting applications. The topcoat formulation may also be dissolvable in (e.g., removeable by) one or more additional solvents.

As discussed previously, each of basecoat layer 102 and ink layer 104 can include a polyol compound which acts as a film forming component, and as such, each of basecoat layer 102, ink layer 104, and topcoat layer 106 can share the same film forming component (e.g., polyol compound). Furthermore, and also as discussed previously, basecoat layer 102 may include free isocyanate groups which interact with the polyol compound of the ink layer 104 when forming the stackup 101. In this case, topcoat layer 106 can also contain free isocyanate groups which further interact with the polyol compound of the ink layer 104 when forming stackup 101. For instance, each of the basecoat layer 102 and topcoat layer 106 may include an excess isocyanate group that interacts with the polyol of the polyester, acrylate, polycarbonate, or polyether-based compound of ink layer 104. This chemical compatibility (e.g., based upon the chemical interactions between the isocyanate and polyol) of each of the basecoat layer 102, ink layer 104, and topcoat layer 106 results in a homogeneous stackup 101 with respect to at least the resulting polyurethane film forming component.

The layers of stackup 101, once cured, form a single homogeneous polyurethane layer. The chemical compatibility of each layer allows for the ink system to chemically react forming the homogenous polyurethane coating. Specifically, since each of the basecoat layer 102 and topcoat layer 106 includes both an isocyanate component and a polyol component, and the ink layer includes a similar (or the same) polyol component, each of the polyols and isocyanates can interact between the three layers of stackup 101 to form a homogeneous polyurethane film. This polyurethane layer may be homogenously formed without the migration of other components such as pigments, fillers, or additives. Therefore, complex liveries or painting schemes can be preserved within the homogeneous polyurethane coating.

The resulting coatings may demonstrate improved chemical resistance, resistance to erosion, durability, inter/intra-coat adhesion, resistance to rain erosion, gloss, buffability, stain resistance, smoothness, and minimization of surface defects as compared with traditional coatings. These improved characteristics result, at least in part, due to the chemical compatibility of each of the basecoat layer 102, ink layer 104, and topcoat layer 106. Specifically, the chemical compatibility of the ink layer 104 with both basecoat layer 102 and topcoat layer 106 preserves the performance characteristics of each of the basecoat formulations and the clearcoat formulations since the ink formulation does not detrimentally effect either layer's chemistry and cures in conjunction with each of the basecoat layer 102 and topcoat layer 106 to form the resulting homogeneous polyurethane film.

III. Stackup Application

Each of basecoat layer 102, ink layer 104, and topcoat layer 106 (as well as the additional primer layer(s) and/or clearcoat layer(s) discussed previously) can be applied in separate application steps. For example, basecoat layer 102 can be applied to a top surface of a substrate, such as the outer surface of an aircraft, which may be a bare, cleaned surface, may be an oily surface, may be pretreated with one or more pretreatment compositions, and/or may be pre-primed with a primer. The basecoat layer 102 can be applied to the substrate by any method including, but not limited to, spraying, dip coating, roll coating, curtain coating, electrodeposition, and the like. The application can be performed manually (e.g., via a person) or may be automated (e.g., via robotic application). The basecoat layer 102 can be allowed to partially gel and/or cure on the substrate prior to the application of ink layer 104, or ink layer 104 may be applied directly to a completely cured basecoat layer 102. For example, basecoat layer 102 may be allowed to dry to tape, whereas ink layer 104 is applied to the dried basecoat layer 102.

Ink layer 104 may be applied to the top surface of the basecoat layer 102 using an ink jet or paint jet liquid printing method. As discussed previously, the ink formulation of ink layer 104 may include one or more additives that enables a rheology profile suitable for inkjet applications. For example, the ink formulation may include a solvent (such as acetone) in amount suitable to thin the rheology of the ink formulation to a viscosity suitable for printing. The colorants of the ink formulation may also be selected for inkjet printing suitability.

Ink layer 104 may be applied using an inkjet printing system which includes a print head and a print head controller. The print head may include multiple liquid ejectors to print the graphic medium as well as at least one image acquisition device. The print head controller may include at least one input communicably coupled to at least one optical scanner in the print head and a controller circuit communicably coupled to at least one input interface and at least one output interface. Optionally, the inkjet printing system may include one or more robotic features, such as a rotatable arm(s) and/or a robotic controller, whereas the print head is attached to a portion of the arm and applied via an automated (e.g., robotic) process. In other cases, the inkjet system may be a handheld inkjet printing device. Inkjet printing of the ink layer 104 allows for complex painting schemes to be applied to the top surface of basecoat layer 102 in a cost effective and efficient manner. Ink layer 104 may be allowed to partially or fully gel and/or dry prior to the application of topcoat layer 106, or topcoat layer 106 may be applied to ink layer 104 prior to partial or full gelling/drying.

Similar to basecoat layer 102, topcoat layer 106 can be applied to the top surface of the ink layer 104 by any method including, but not limited to, spraying, dip coating, roll coating, curtain coating, electrodeposition, and the like. The application can be performed manually (e.g., via a person) or may be automated (e.g., via robotic application).

As discussed previously, each of basecoat layer 102, ink layer 104, and topcoat layer 106 are chemically compatible. In this case, once topcoat layer 106 has cured, each of basecoat layer 102, ink layer 104, and topcoat layer 106 form the single homogenous stackup 101, exhibiting the improved chemical resistance, resistance to erosion, durability, smoothness (e.g., low orange peeling and minimization of surface defects), surface adhesion, inter/intra-coat adhesion, buffability, and stain resistance, while preserving the painting scheme printed on the aircraft via the inkjet printing method.

While particular instances of this disclosure have been described above for purposes of illustration, it will be evident to those skilled in the art that numerous variations of the details of the present disclosure may be made without departing from the disclosure as defined in the appended claims.

EXAMPLES

The following examples were prepared by first adding all the components, with the exception of pigments and ketone-based solvents, of each of tables 1 or 2 to a clean vessel. The components were mixed until fully homogenized. The pigment was then added to the mixture and dispersed throughout the mixture using high speed mixing. The mixture was then milled with grinding media until the minimum particle size, measured using a Hegman gauge, was approximately 12.7 μm (7 Hegman rating). Additional solvent (e.g., the ketone-based solvent) was added to reduce the viscosity to a level sufficient for inkjet application. The resulting mixture was inkjet printed.

i. Ink Formulations

TABLE 1

Mass balance for blue ink formulation.

| Material | Weight % |
| --- | --- |
| Film Former (polyester-based resin) | 40-70 |
| Solvent (propylene based) | 15-35 |
| UV Screener 1 (Triazine) | 0.1-2 |
| UV Screener 2 (HALS) | 0.1-1 |
| Pigment (Blue) | 5-15 |
| Solvent (ketone based) | +0-50 |

Table 1 provides the mass balance for a blue colored ink formulation in accordance with the present disclosure.

TABLE 2

Mass balance for prototype black ink formula.

| Category | Weight % |
| --- | --- |
| Film Former (polyester-based resin) | 45-75 |
| Solvent (propylene based) | 15-35 |
| UV Screener 1 (Triazine) | 0.1-2 |
| UV Screener 2 (HALS) | 0.1-1 |
| Pigment (Black) | 1-7 |
| Solvent (ketone based) | +0-50 |

Table 2 provides the mass balance for a black colored ink formulation.

ii. Compatibility with Basecoat and Topcoat Systems

The present disclosure provides a system which is compatible with a wide variety of aerospace paint formulations. The below experiments were performed to evaluate the compatibility of basecoat/clearcoat (BCCC) systems with the disclosed ink formulations. The basecoat and ink dry times were varied to evaluate and determine appropriate clearcoat times. In addition, the stoichiometry of the clearcoat was varied to determine the formulation most compatible with the basecoat and ink stack-up as well as demonstrate the flexibility of the ink system.

TABLE 3

Compatibility of ink formulations with basecoat and topcoat systems.

| Ex. | Stackup | BC Dry time (hr) | Ink Dry time (hr) | CC Mix ratio | Adhesion Dry | Adhesion Wet | Hardness Cured coating | Hardness 7 days in Skydrol |
| --- | --- | --- | --- | --- | --- | --- | --- | --- |
| 1 | 1: Primer | 24 | 2 | 1:1 | 4B | 5 | 2H | 2H |
| 2 | 2: White BC | 2 | 2 | 2:1 | 5 | 5 | 2H | 2H |
| 3 | 3: Ink | 24 | 2 | 2:1 | 4A | 5 | 2H | 2H |
| 4 | 4: Clearcoat | 2 | 24 | 2:1 | 5 | 5 | 2H | 2H |

The following test results indicate various dry times for BC (basecoat layer) and Ink (ink layer) in hours (hr), various CC (clear coat) mix ratios in relation to the proportion of acrylate (NCO) to polyol (OH) of the clearcoat formulations, and the resulting 1) wet and dry adhesion as determined by ASTM D3359-02, and 2) hardness as determined by the Pencil Hardness of ASTM D-3363-00 and ISO 15184 after curing, and again after a 7-day immersion in a hydraulic fluid media (e.g., Skydrol).

Whereas particular examples of this disclosure have been described above for purposes of illustration, it will be evident to those skilled in the art that numerous variations of the details of the present disclosure may be made without departing from what is defined in the appended claims.

The invention claimed is:

1. A method for applying a coating to a surface of an aircraft, the method comprising:
  (a) applying a basecoat layer;
  (b) applying an ink layer onto a top surface of the basecoat layer; and
  (c) applying a topcoat layer onto a top surface of the ink layer,
  wherein:
    each of the basecoat layer, the ink layer, and the topcoat layer interact to form a single homogenous layer with respect to a film forming component on the surface of the aircraft; and
    each of the basecoat layer, the ink layer, and the topcoat layer share a first reactant, the basecoat layer and the topcoat layer share a second reactant, and the first reactant and the second reactant interact to form the film forming component.

2. The method of claim 1, wherein the formation of the single homogenous layer is based upon the chemical compatibility of the basecoat layer, the ink layer, and the topcoat layer.

3. The method of claim 1, wherein the first reactant is an alcohol containing compound and the second reactant is a isocyanate containing compound.

4. The method of claim 1, wherein the first reactant comprises one of a polyester-based compound, an acrylic-based compound, a polycarbonate-based compound, and/or a polyether-based compound.

5. The method of claim 1, wherein any one of the basecoat layer, ink layer, and the topcoat layer are dissolvable in a solvent.

6. The method of claim 1, wherein the single homogenous layer substantially maintains the physical and chemical characteristics of the basecoat layer and the topcoat layer.

7. The method of claim 6, wherein the maintained physical and chemical characteristics includes any one of a chemical resistance, a resistance to erosion, a durability, a smoothness, a surface adhesion, an intercoat adhesion, an intracoat adhesion, a buffability, and/or a stain resistance of either the basecoat layer and/or the topcoat layer.

8. The method of claim 1, wherein the basecoat layer is applied in a first spraying operation.

9. The method of claim 1, wherein the ink layer is applied by a first printing operation.

10. The method of claim 9, wherein the printing operation is inkjet-type printing.

11. The method of claim 9, wherein the topcoat is applied in a second spraying operation.

12. The method of claim 11, wherein the first spraying operation and/or the second spraying operation are performed manually or robotically.

13. The method of claim 1, wherein the basecoat layer is applied on an exterior surface of the aircraft.

\* \* \* \* \*